May 4, 1948.  C. Z. ALEXANDER  2,440,998
STORAGE WATER HEATER HAVING A HEATING CHAMBER AND FLUE
Filed Oct. 28, 1944
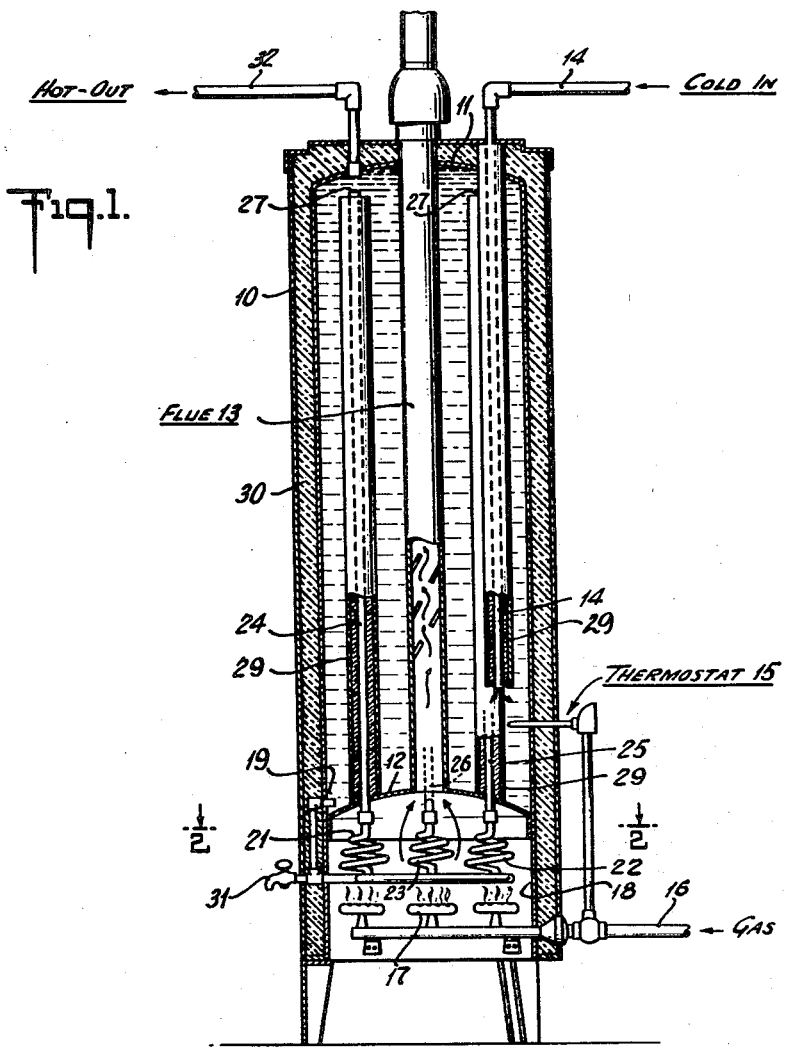
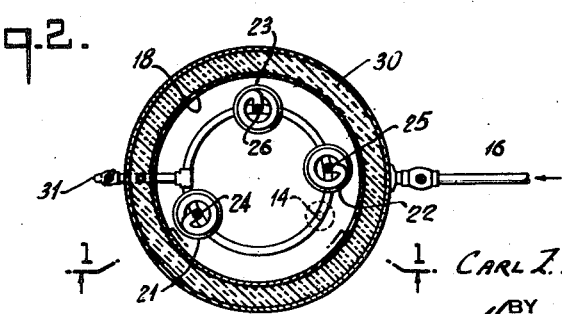
INVENTOR
CARL Z. ALEXANDER
BY
ATTORNEY

UNITED STATES PATENT OFFICE 2,440,998

STORAGE WATER HEATER HAVING A HEATING CHAMBER AND FLUE

Carl Z. Alexander, Springfield, N. J.

Application October 28, 1944, Serial No. 560,843

4 Claims. (Cl. 122—18)

This invention relates to storage water heaters, and it is the object of the invention to provide a storage water heater so constructed as to provide for the rapid heating of water when desired, and for reducing to a minimum dissipation of heat in operation of the heater.

A further object is to provide a storage water heater wherein practically instantaneous hot water may be obtained in an economical manner when desired, and hot water may be drawn from the tank practically continually, as contrasted with the usual arrangement in which it is necessary to utilize considerable time and fuel for the heating of the water in the tank to provide a fixed supply, which, when exhausted, necessitates a repetition of a slow process of heating the water.

An embodiment of a structure employing my invention is shown in the accompanying drawing and described in detail in the ensuing specification. This embodiment is merely by way of example and the invention is not limited thereto but includes all other forms which would come within the scope of the appended claims.

In the drawings,

Fig. 1 is a vertical sectional view, partly fragmentary, of a water storage heater embodying the invention, taken on line 1—1 of Fig. 2, in the direction of the arrows, and Fig. 2 is a transverse horizontal sectional view taken on line 2—2 of Fig. 1.

Referring to the drawings which embody one form of the invention, there is shown a storage water heater comprising the tank 10 which is preferably externally insulated as shown at 30, by an external housing and intermediate insulating material, said tank having a top or dome 11 and provided with a bottom plate 12 which also constitutes the top of a water make-up chamber 18 containing the coils 21, 22 and 23 and the heating elements, such as gas burners 17.

Cold water is introduced to the tank from a suitable source through the pipe 14 which passes through the top 11 of the tank and projects into the tank. For the purpose of insulating the contents of the tank 10 for the length of cold water pipe 14, said pipe, as shown in the drawings, is enclosed interiorly of the tank within another pipe which is sealed adjacent the lower end of pipe 14, the intervening space being preferably filled with an insulating material 29, said insulating outer pipe and material extending upwardly at least to the point of entry of pipe 14 into the tank 10. The pipe 14 terminates at a distance above the plate 12 (defining the lower end of the tank) adjacent the thermostat 15 which may be of any desired or convenient construction to control the flow of gas or other heating medium from the pipe 16 or the like, to burners or other heating units 17 in the make-up chamber 18.

Cold water is drawn from a point adjacent the bottom 12 of the interior of tank 10 by a feeder tube 19 which preferably passes from the tank through the insulated portion of the tank and to the make-up chamber 18 where it is connected to the coils 21, 22 and 23. The cold water thus drawn from the bottom of the tank to the coils 21, 22 and 23, is heated and rises through the hot water pipes 24, 25 and 26 connected to said coils. Pipes 24, 25 and 26 are preferably insulated (as at 29) by enclosing the same within larger pipes, the intervening space being filled with a suitable insulating material, as shown, said outer pipes being preferably sealed to the enclosed pipes adjacent the upper ends of the latter and being sealed to the bottom 12 of the tank. The water pipes 24, 25 and 26 terminate in open ends interiorly of the tank 10 at point preferably close to the top 11 of the tank as shown, whereby the hot water passing into the pipes 24, 25 and 26 will be discharged into the tank at the upper ends thereof. The hot water is drawn from the tank through the pipe 32 which is tapped through the top 11 of the tank for that purpose. A suitable drain cock 31 is preferably connected directly to the L-shaped feeder tube 19 as shown.

A flue 13 preferably passes vertically medially from the make-up chamber 18, through the tank and to an exterior discharge point for the escape of gases from the make-up chamber 18. It will be understood that, if desired, a plurality of flues may be provided, or a single flue of a different construction or location than that shown in the drawing, may be provided, for the purpose described.

While I have shown a plurality of coils 21, 22 and 23, to which the feeder tube 19 is connected, one or more of such tubes and coils may be used for the purpose described, within the scope of this invention.

One of the disadvantages encountered in the use of conventional storage water heaters, is that there is a tendency for the water to stagnate at the lower end of the tank. This objectionable feature is overcome in the structure of my invention since the water at the lower end of the tank is drawn off by the feeder tube 19 to the heating coils, insuring adequate circulation of water. It will further be noted that the incoming water (pipe 14) is insulated from the warm water in the tank by insulation of the cold water pipe 14 from its point of entry into the tank to its position of discharge immediately above the plane of thermostat 15. Thus there is provided a storage water heater wherein the water is well circulated and wherein practically instantaneous hot water may be obtained in an economical manner when desired, and hot water may be stored in and drawn from the tank practically continually with a minimum dissipation of heat.

Having thus described my invention, what I claim as new and desire to secure by Letters Patent is:

1. A water heater comprising, in combination, a vertically disposed inner tank, an outer tank spaced from the inner tank, heat insulation in the space between the inner tank and the outer tank, a cold water supply pipe entering the inner tank at the top thereof and passing longitudinally substantially vertically through the tank and discharging at a point adjacent to but spaced from the bottom thereof, thermal insulation enclosing the cold water supply pipe throughout its passage through the inner tank, a make-up chamber in the inner tank at the bottom thereof, a plurality of pipe coils in the make-up chamber, heating means in the make-up chamber for the pipe coils, means for supplying heating fluid to the heating means, a feeder tube communicating at one end with the interior of the inner tank in advance of the make-up chamber and communicating with the pipe coils for supplying water to be heated to the coils, hot water conducting pipes connected with the coils and extending longitudinally substantially vertically through the inner tank to a plane adjacent to the top of the inner tank, thermal insulation enclosing the hot water conducting pipes throughout their length, said hot water pipes having discharge openings at their top ends.

2. A water heater comprising, in combination, an inner tank having a discharge end and a heating end, an outer tank enclosing the inner tank and spaced therefrom, thermal insulation in the space between the inner tank and the outer tank, a cold water supply pipe entering the outer tank and the inner tank through the discharge end thereof and extending longitudinally through the inner tank and discharging at a point adjacent to but spaced from the heating end of the tank, thermal insulation enclosing the cold water supply pipe throughout its passage through the inner tank, a make-up chamber in the heating end of the inner tank, a plurality of pipe coils in the make-up chamber, heating means for the pipe coils, means for supplying a heating medium to the heating means, a substantially L-shaped feeder tube communicating at one end with the interior of the inner tank in advance of the make-up chamber and communicating with the pipe coils for supplying water to be heated to the coils, the feeder tube extending through the insulation between the inner and outer tanks for inhibiting thermal losses from the feeder tube, hot water conducting pipes connected with the pipe coils and extending longitudinally through the inner tank to a plane adjacent to the discharge end thereof, hot water off-take means communicating with the discharge end of the inner tank, thermal insulation enclosing the hot water conducting pipes throughout their length, and thermostatic means positioned adjacent to the discharge end of the cold water supply pipe for supplying a heating medium to the heating means responsively to introduction of cold water into the inner tank said hot water pipes having discharge openings at their top ends, the introduction of cold water being responsive to withdrawal of hot water from the tank.

3. A water heater comprising, in combination, an inner tank having a discharge end and a heating end, an outer tank enclosing the inner tank and spaced therefrom, thermal insulation in the space between the inner tank and the outer tank, a cold-water supply pipe entering the outer tank and the inner tank through the discharge end thereof and extending longitudinally through the inner tank and discharging at a point adjacent to but spaced from the heating end of the tank, thermal insulation enclosing the cold water supply pipe throughout its passage through the inner tank, a make-up chamber in the heating end of the inner tank, a pipe coil in the make-up chamber, heating means for the pipe coil, an L-shaped feeder tube communicating at one end with the interior of the inner tank in advance of the make-up chamber and communicating with the pipe coil for supplying water to be heated to the coil, the feeder tube extending through the insulation between the inner and outer tanks for inhibiting thermal losses from the feeder tube, a hot water conducting pipe connected with the pipe coil and extending longitudinally through the inner tank, the hot water conducting pipe terminating in an open end interiorly of the inner tank adjacent to the discharge end of the inner tank, and thermal insulation enclosing the hot water conducting pipe, the said insulation being a relatively large enclosing pipe surrounding the hot water conducting pipe and spaced therefrom, the resulting intervening space between the enclosing pipe and the hot water conducting pipe being filled with heat insulating material, the enclosing pipe being sealed to the hot water conducting pipe adjacent to the discharge end thereof and also being sealed to the top of the make-up chamber.

4. A water heater comprising, in combination, an inner tank having a discharge end and a heating end, an outer tank enclosing the inner tank and spaced therefrom, thermal insulation in the space between the inner tank and the outer tank, a cold water supply pipe entering the outer tank and the inner tank through the discharge end thereof and extending longitudinally through the inner tank and discharging at a point adjacent to but spaced from the heating end of the tank, thermal insulation enclosing the cold water supply pipe throughout its passage through the inner tank, a make-up chamber in the heating end of the inner tank, a pipe coil in the make-up chamber, heating means for the pipe coil, an L-shaped feeder tube communicating at one end with the interior of the inner tank in advance of the make-up chamber and communicating with the pipe coil for supplying water to be heated to the coil, the feeder tube extending through the insulation between the inner and outer tanks for inhibiting thermal losses from the feeder tube, a hot water conducting pipe connected with the pipe coil and extending longitudinally through the inner tank, the hot water conducting pipe terminating in an open end interiorly of the inner tank adjacent to the discharge end of the inner tank, a vent for the make-up chamber extending longitudinally axially through the inner tank and out from the outer tank, and thermal insulation being a relatively large enclosing pipe surrounding the hot water conducting pipe and spaced therefrom, the resulting intervening space being filled with heat-insulating material, the enclosing pipe being sealed to the hot water conducting pipe adjacent to the discharge end thereof and also being sealed to the top of the make-up chamber.

CARL Z. ALEXANDER.

REFERENCES CITED

The following references are of record in the file of this patent:

UNITED STATES PATENTS

| Number | Name | Date |
|---|---|---|
| 783,306 | Pfingst | Feb. 21, 1905 |
| 929,081 | Enterline | July 27, 1909 |
| 1,177,255 | Lawrence | Mar. 28, 1916 |
| 1,514,514 | Fraser | Nov. 4, 1924 |
| 1,566,209 | Haus | Dec. 15, 1925 |
| 1,747,982 | Mauck | Feb. 18, 1930 |
| 1,750,958 | Goshorn | Mar. 18, 1930 |
| 2,366,507 | Ford | Jan. 2, 1945 |